(12) United States Patent
Zhang et al.

(10) Patent No.: US 10,367,189 B2
(45) Date of Patent: Jul. 30, 2019

(54) ANODE-FREE RECHARGEABLE BATTERY

(71) Applicant: Battelle Memorial Institute, Richland, WA (US)

(72) Inventors: Ji-Guang Zhang, Richland, WA (US); Jiangfeng Qian, Richland, WA (US); Wu Xu, Richland, WA (US); Wesley A. Henderson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 305 days.

(21) Appl. No.: 14/482,312

(22) Filed: Sep. 10, 2014

(65) Prior Publication Data

US 2016/0261000 A1   Sep. 8, 2016

(51) Int. Cl.
| | | |
|---|---|---|
| *H01M 10/0564* | (2010.01) | |
| *H01M 4/04* | (2006.01) | |
| *H01M 4/66* | (2006.01) | |
| *H01M 10/0568* | (2010.01) | |
| *H01M 10/0569* | (2010.01) | |
| *H01M 4/40* | (2006.01) | |
| *H01M 10/052* | (2010.01) | |
| *H01M 4/525* | (2010.01) | |

(Continued)

(52) U.S. Cl.
CPC .......... *H01M 4/0445* (2013.01); *H01M 4/40* (2013.01); *H01M 4/405* (2013.01); *H01M 4/661* (2013.01); *H01M 10/052* (2013.01); *H01M 10/0568* (2013.01); *H01M 10/0569* (2013.01); *H01M 4/505* (2013.01); *H01M 4/525* (2013.01); *H01M 2004/028* (2013.01); *Y02T 10/7011* (2013.01)

(58) Field of Classification Search
CPC ......... H01M 10/0525; H01M 10/0568; H01M 10/0569; H01M 10/0565; H01M 4/661; H01M 4/525; H01M 4/505; H01M 4/0445; Y02T 10/7011
See application file for complete search history.

(56) References Cited

U.S. PATENT DOCUMENTS

| | | |
|---|---|---|
| 6,805,999 B2 | 10/2004 | Lee et al. |
| 7,632,602 B2 | 12/2009 | Lee et al. |

(Continued)

FOREIGN PATENT DOCUMENTS

| | | |
|---|---|---|
| WO | WO 2004/109823 A1 | 12/2004 |
| WO | WO 2013/004957 A1 | 1/2013 |
| WO | WO 2015/057808 A1 | 4/2015 |

OTHER PUBLICATIONS

Xu et al (Lithium metal anodes for rechargeable batteries. Energy & Environmental Science. 2014, 7, 512-537).*

(Continued)

*Primary Examiner* — Stephen J Yanchuk
(74) *Attorney, Agent, or Firm* — Klarquist Sparkman, LLP

(57) ABSTRACT

An anode-free rechargeable battery is disclosed. The battery includes an anode current collector and a cathode containing an active cation $M^{n+}$, where n=1, 2, or 3. The anode-free rechargeable battery further includes a separator placed between the anode current collector and the cathode. The anode-free rechargeable battery also includes an electrolyte including a salt or salt mixture containing an active cation $M^{n+}$ dissolved in a solvent or solvent mixture.

10 Claims, 12 Drawing Sheets

(51) Int. Cl.
*H01M 4/505* (2010.01)
*H01M 4/02* (2006.01)

(56) References Cited

U.S. PATENT DOCUMENTS

| | | | |
|---|---|---|---|
| 8,722,256 B2 | 5/2014 | Narula et al. | |
| 8,795,899 B2 | 8/2014 | Liu et al. | |
| 8,900,755 B2 | 12/2014 | Liu et al. | |
| 9,543,613 B2 | 1/2017 | Ihara et al. | |
| 9,779,883 B2 | 10/2017 | Zhamu et al. | |
| 2004/0253510 A1 | 12/2004 | Jonghe et al. | |
| 2005/0266310 A1* | 12/2005 | Chia | H01M 4/133 429/217 |
| 2008/0026292 A1* | 1/2008 | Paulsen | H01M 4/505 429/231.3 |
| 2009/0212743 A1* | 8/2009 | Hagiwara | C07C 311/48 320/137 |
| 2011/0104526 A1 | 5/2011 | Boxley et al. | |
| 2011/0195310 A1* | 8/2011 | Kawamoto | H01M 4/131 429/231.3 |
| 2015/0050561 A1* | 2/2015 | Zhang | H01M 10/0569 429/332 |
| 2015/0295236 A1 | 10/2015 | Senguttuvan et al. | |
| 2016/0028122 A1* | 1/2016 | Zhamu | H01M 10/0569 429/300 |
| 2016/0268661 A1 | 9/2016 | Kim et al. | |
| 2016/0359158 A1 | 12/2016 | Janakiraman et al. | |

OTHER PUBLICATIONS

Whittingham, M. S., History, Evolution, and Future Status of Energy Storage, Proceedings of the IEEE, 100, 2012, 1518-1534.
Aurbach, D., et al., The Application of Atomic Force Microscopy for the Study of Li Deposition Processes, Journal of the Electrochemical Society, 161, 5, 2014, A827-A830.
Woo, J., et al., Symmetrical Impedance Study on Inactivation Induced Degradation of Lithium Electrodes for Batteries Beyond Lithium-Ion.
Neudecker, B. J., et al., "Lithium-Free" Thin-Film Battery with In Situ Plated Li Anode, Journal of the Electrochemical Society, 147, 2, 2000, 517-523.
Bates, J. B., et al. Fabrication and characterization of amorphous lithium electrolyte thin films and rechargeable thin-film batteries, Journal of Power Sources, 43-44, 1993, 103-110.
Bates, J. B., et al., Thin-film rechargeable lithium batteries, Journal of Power Sources, 54, 1995, 58-62.
Park, M. S., et al., A Highly Reversible Lithium Metal Anode, Scientific Reports, 4, 3815, doi:10.1038/srep038515.
Lopez et al., "Morphological Transitions on Lithium Metal Anodes," *J. Electrochem. Soc.* 2009, 156:A726-A729. (Abstract only).
Steiger et al., "Microscopic observations of the formation, growth and shrinkage of lithium moss during electrodeposition and dissolution," *Electrochim. Acta,* Aug. 2014, 136:529-536. (Abstract only).
Forero et al., "Effects of High and Low Salt Concentration in Electrolytes at Lithium-Metal Anode Surfaces," *J. Phys. Chem.* 2017, 121:182-194.
Gmyrek, "Effect of Electrolyte Concentration on the Performance of Batteries," *Honors Theses* 2015, Salem State University, 11 pages.
Niedzicki, et al., "Optimization of the Lithium-ion Cell Electrolyte Composition through the use of the LiTDI Salt," *Electrochim. Acta* 117C (2014), pp. 224-229.
Office Action, dated Aug. 8, 2017, issued in related U.S. Appl. No. 14/869,647.
Aurbach et al., "A short review of failure mechanisms of lithium metal and lithiated graphite anodes in liquid electrolyte solutions," *Solid State Ionics* 2002, 148:405-416.
Cao et al., "Enabling room temperature sodium metal batteries," *Nano Energy* 2016, 30:825-830 (pre-print version).
Qian et al., "High rate and stable cycling of lithium metal anode," *Nature Communications* 2015, 6:6362, 9 pp.
Qian et al., "Anode-free rechargeable lithium metal batteries," *Advanced Functional Materials* 2016, 26:7094-7102.
Response to Non-Final Office Action for U.S. Appl. No. 14/121,050, dated Dec. 4, 2017, 29 pp.
Response to Final Office Action for U.S. Appl. No. 14/121,050, dated Apr. 25, 2018, 14 pp.

\* cited by examiner

ANODE-FREE RECHARGEABLE BATTERY

STATEMENT REGARDING FEDERALLY SPONSORED RESEARCH OR DEVELOPMENT

This invention was made with Government support under Contract DE-AC05-76RL01830, awarded by the U.S. Department of Energy. The Government has certain rights in the invention.

TECHNICAL FIELD

This invention relates to anode-free rechargeable batteries. More specifically, this invention relates to anode-free rechargeable batteries including a liquid or polymer electrolyte with high Coulombic Efficiency (CE).

BACKGROUND OF THE INVENTION

Energy storage devices such as batteries with high energy density and power density, long cycle life and calendar life, good safety and low cost are in high demand to supply power for electronic devices, electric vehicles (EVs) and Smart Grid. To date, lithium (Li)-ion batteries have been one of the most widely used energy storage systems for portable electronics and EVs. A typical Li-ion battery consists of a multiple stack of anode current collector/anode/separator/cathode/cathode current collector, all soaked in liquid electrolyte.

Li metal has an extremely high theoretical specific capacity (3860 mAh g$^{-1}$), low density (0.59 g cm$^{-3}$) and the lowest negative electrochemical potential (−3.040 V vs. standard hydrogen electrode); thus rechargeable Li metal batteries have been investigated extensively during the last 40 years (M. S. Whittingham, *Proceedings of the IEEE* 2012, 100, 1518-1534; D. Aurbach and Y. Cohen, *Journal of The Electrochemical Society*, 1996, 143, 3525-3532). Li metal is also the basis for Li-air batteries and Li-sulfur batteries. Unfortunately, rechargeable batteries based on Li metal anode have not yet been commercialized in large scale. There are two main barriers to the development of Li metal batteries: one is the growth of Li dendrites during repeated charge/discharge processes, and another is the low CE of these processes. These two barriers consequently lead to two critical problems for the Li anode: one is safety hazards because of potential internal short circuits and the high surface area of the active material resulting in high reactivity; another is the short cycle life of such batteries. Although low CE can be partially compensated by the inclusion of an excess amount of Li metal, for example, a 300% excess of Li was a common feature in the early development of Li metal batteries—but the dendrite-growth related battery failure (sometimes dramatic failure that leads to fire and other hazards), and the emergence of Li-ion batteries have largely diminished industry's efforts devoted to the development of rechargeable Li metal batteries since the early 1990s.

SUMMARY OF THE INVENTION

The present invention is directed to anode-free rechargeable batteries and methods of forming an anode-free rechargeable battery.

In one embodiment, an anode-free rechargeable battery is disclosed. The battery includes an anode current collector, a cathode containing an active cation $M^{n+}$ (where n=1, 2, or 3), a cathode active materials—in either solid form or as a liquid catholyte—and with or without a cathode current collector. The battery also includes a separator disposed or placed between the anode current collector and cathode. The battery further includes an electrolyte consisting of a salt or salt mixture dissolved in a solvent, solvent mixture and/or polymer. In one embodiment, the separator is infused with the electrolyte including the $M^{n+}$ salt dissolved in the solvent.

In one embodiment, the active cation $M^{n+}$ is a lithium cation (Li$^+$). In another embodiment, the active cation $M^{n+}$ is selected from Na$^+$, K$^+$, Mg$^{2+}$, Ca$^{2+}$, Zn$^{2+}$, Al$^{3+}$, or Ag$^+$.

In one embodiment, the concentration of the $M^{n+}$ salt is between 1.1-8 mole per liter (M).

In one embodiment, the separator is a porous polymer material with or without ceramic coatings or composites.

In one embodiment, the separator is infused with the electrolyte including the lithium salt dissolved in a non-aqueous solvent. In one embodiment, the concentration of the lithium salt is between 1.1-8 M.

The lithium salt of the electrolyte is, but is not limited to, lithium bis(fluorosulfonyl)imide (LiFSI), lithium hexafluoroarsenate (LiAsF$_6$), lithium trifluoromethanesulfonate (LiCF$_3$SO$_3$), lithium bis(trifluoromethanesulfonyl)imide (LiTFSI), lithium bis(oxalato)borate (LiBOB), lithium difluoro(oxalato)borate (LiDFOB), lithium perchlorate (LiClO$_4$), lithium tetrafluoroborate (LiBF$_4$), or mixtures thereof.

In one embodiment, at least one of the following non-lithium salts or additives are added to the lithium salts: CsFSI, CsTFSI, NaFSI-CsFSI, Mg(TFSI)$_2$-CsTFSI, and Zn(TFSI)$_2$.

The non-aqueous solvent may be, but is not limited to, 1,2-dimethoxyethane (DME), diglyme, triglyme, tetraglyme, diethyl ether, 1,3-dioxolane, 1,4-dioxane, tetrahydrofuran, 2,5-dimethyltetrahydrofuran, ethylene carbonate, propylene carbonate, dimethyl carbonate, ethyl methyl carbonate, diethyl carbonate, vinylene carbonate, fluoroethylene carbonate, vinyl ethylene carbonate, trimethyl phosphate, triethyl phosphate, triphenyl phosphate,tris(2,2,2-trifluoroethyl)phosphate,tris(2,2,2-trifluoroethyl)phosphite, dimethyl sulfone, ethyl methyl sulfone, sulfolane, sulfoxide, acetonitrile, propionitrile, butyronitrile, or a mixture thereof.

In one embodiment, the lithium salt of the electrolyte is LiFSI dissolved in the DME solvent, and the concentration of the salt is between 1.1-8 M. In another embodiment, the concentration of the LiFSI in the DME is between 3-8 M.

In one embodiment, the anode current collector comprises copper, nickel, iron, or other metals that are stable when in contact with Li metal and the electrolyte within the operating voltage window of the battery.

In one embodiment, the anode current collector comprises copper, and the cathode is a free standing film including lithium-containing compounds mixed with a conductive additive and a binder.

In one embodiment, the anode current collector comprises copper, the cathode comprises lithium-containing compounds, a conductive additive, and a binder, and the cathode current collector comprises aluminum.

The anode-free rechargeable battery can have a Coulombic Efficiency of at least 95% after the first cycle.

In another embodiment of the present invention, a method of forming an anode-free rechargeable battery is disclosed. The method includes utilizing an anode current collector, and a cathode with or without a cathode current collector. The cathode active material can be in a liquid phase as a catholyte. The method also includes placing a separator between the anode current collector and the cathode, wherein the separator is infused with an electrolyte consisting of one or more lithium salts dissolved in one or more non-aqueous solvent or polymers. The anode is formed in situ on the surface of the anode current collector during the charging process of the battery, and the anode active material is consumed by the electrochemical battery reaction during the discharge process of the battery. A separator may not be used, however, if, for example, a resistive interface is formed which prevents direct contact between the cathode or catholyte and the in situ formed anode material.

In another embodiment of the present invention, an anode-free rechargeable battery is disclosed. The anode-free rechargeable battery includes a copper anode current collector and a cathode including lithium containing compounds, with or without a cathode current collector which can be aluminum, nickel, titanium, stainless steel, or carbon paper. The anode-free rechargeable battery also includes a separator placed between the anode current collector and the cathode. The anode-free rechargeable battery further includes an electrolyte consisting of one or more lithium salts dissolved in one or more non-aqueous solvent or polymers. The separator is infused with the electrolyte. The lithium salt is LiFSI dissolved in the DME solvent. The concentration of the LiFSI in the DME is between 1.1-8 M, and the battery has a CE of at least 95% after the first cycle.

In another embodiment of the present invention, a method of forming an anode-free rechargeable battery is disclosed. The method includes utilizing a copper anode current collector and a lithium containing cathode with or without an aluminum cathode current collector. The method also includes positioning or placing a separator between the anode current collector and the cathode. The separator is infused with an electrolyte including a LiFSI lithium salt dissolved in a DME solvent. The Li anode is formed in situ on the surface of the anode current collector facing to the separator during the charging process of the battery, and the Li anode is consumed during the discharge process of the battery.

In one embodiment, the concentration of the LiFSI in the DME is between 3-6 M, and the battery has a Coulombic Efficiency of at least 95% after the first cycle.

DETAILED DESCRIPTION OF THE PREFERRED EMBODIMENTS

The present invention is directed to anode-free rechargeable batteries with high Coulombic Efficiencies. In one embodiment, the anode-free rechargeable battery includes a liquid or polymer electrolyte, a current collector as the negative electrode, an ion containing compound or compounds—either through intercalation or conversion—as the positive electrode, and a separator between the positive electrode and negative electrode. The electrolyte contains the same active ions as those of the positive electrode.

In some embodiments, the negative current collector can be either metal or other conductive materials that will not react with the ions or form an alloy with the ions used in the anode-free battery. The positive electrode is either a free standing film with conductive additive or deposited on a conductive substrate which is stable with the electrolyte within the operation voltage window of the battery. The electrolytes can form a stable solid electrolyte interphase (SEI) layer to minimize the reaction and consumption of selected ions during charge/discharge processes of batteries, especially during a charge process when metal is deposited on the negative current collector or negative electrode.

In some embodiments, the battery is assembled in a fully discharged state with the active ions stored in the cathode. During the initial charge process, ions are extracted from the cathode and deposited on the anode current collector. During the discharge process, metal ions deposited on the anode current collector will serve as the ion source for the intercalation or conversion process of the cathode electrode.

Figure 1:
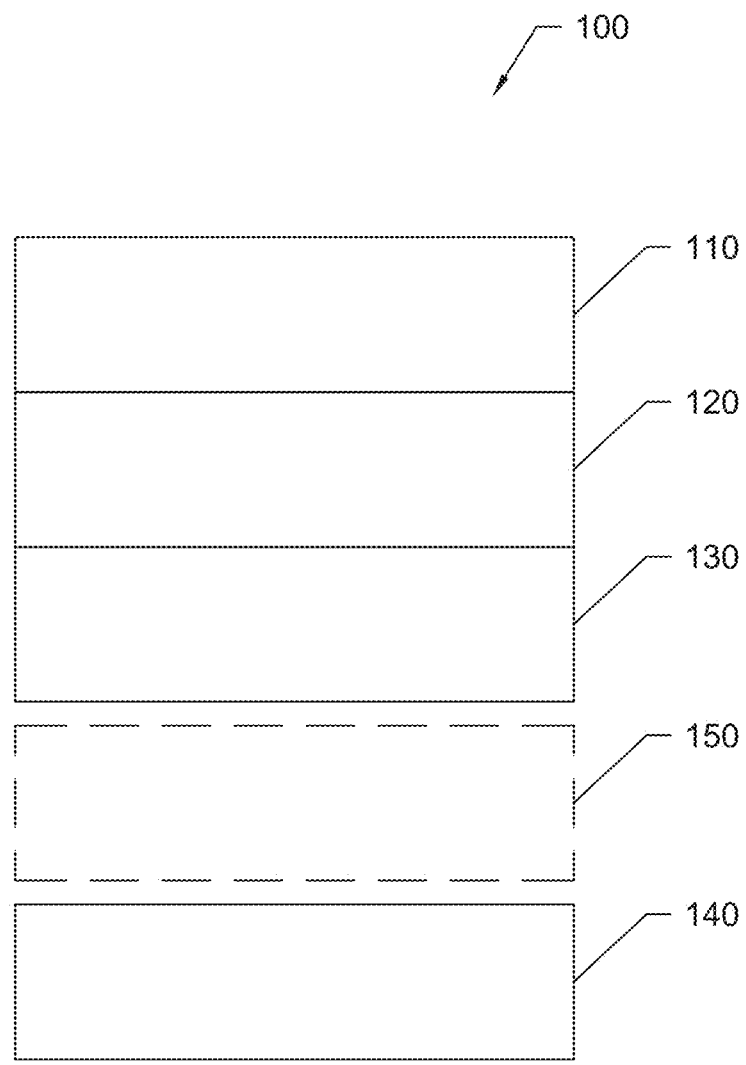
FIG. 1 is a schematic diagram of an anode-free rechargeable battery, in accordance with one embodiment of the present invention.

FIG. 1 is a schematic diagram of an anode-free rechargeable battery 100, in accordance with one embodiment of the present invention. The battery 100 includes a cathode current collector 110, a cathode 120, a separator 130 which, in some embodiments, is infused with an electrolyte, and an anode current collector 140. During a charging process of the battery 100, an anode 150 is formed in situ on the surface of the anode current collector 140 facing the separator 130. The anode active material 150 is consumed during a discharging process of the battery 100.

In some embodiments, the anode-free rechargeable battery is an anode-free Li rechargeable battery. The battery includes a liquid or polymer electrolyte and demonstrates very high Coulombic efficiencies, even larger than 95%, with no battery failure related to dendrite growth. In one specific embodiment, the Coulombic efficiency can be more than 99%.

The negative current collector can be either a metal or other conductive material such as, but not limited to, Ni, Cu, Fe, or conductive carbon materials. The separator can be a porous polymer film such as a polyethylene or polypropylene-based materials with or without ceramic coatings or composites. The electrolyte can be a lithium salt, such as LiFSI, LiAsF$_6$, LiCF$_3$SO$_3$, LiTFSI, LiBOB, LiDFOB, LiClO$_4$, LiBF$_4$, or a mixture thereof, dissolved in a solvent, an ether, a non-aqueous solvent, or solvent mixture, such as DME, diglyme, triglyme, tetraglyme, diethyl ether, 1,3-dioxolane, 1,4-dioxane, tetrahydrofuran, 2,5-dimethyltetrahydrofuran, ethylene carbonate, propylene carbonate, dimethyl carbonate, ethyl methyl carbonate, diethyl carbonate, vinylene carbonate, fluoroethylene carbonate, vinyl ethylene carbonate, trimethyl phosphate, triethyl phosphate, triphenyl phosphate, tris(2,2,2-trifluoroethyl)phosphate, tris(2,2,2-trifluoroethyl)phosphite, dimethyl sulfone, ethyl methyl sulfone, sulfolane, sulfoxide, acetonitrile, propionitrile, butyronitrile, or a mixture thereof.

The concentration of a lithium salt can vary between 1.1-8 M. In one embodiment, the concentration of the lithium salt is between 3-8 M. In another embodiment, the concentration of the lithium salt is between 3-6 M.

The selected electrolyte can form a stable SEI layer to minimize the side reactions between the electrolyte and in situ formed Li metal which largely reduces the consumption of active materials, solvent and salt during the charge/discharge processes of the batteries.

The cathode of the anode-free rechargeable battery may be comprised of lithium transition metal oxides such as LiCoO$_2$, LiMn$_2$O$_4$, LiNiO$_2$, LiNi$_{1/3}$Co$_{1/3}$Mn$_{1/3}$O$_2$ or lithium transition metal phosphates such as LiFePO$_4$ or LiMnPO$_4$. Other cathode materials can include, but are not limited to, Li$_{4-x}$M$_x$Ti$_5$O$_{12}$ (M=Mg, Al, Ba, Sr, or Ta; 0≤x≤1), MnO$_2$, Li$_3$V$_2$O$_5$, LiV$_3$O$_8$, LiM$^{C1}_x$M$^{C21}_{1-x}$PO$_4$ (M$^{C1}$ or M$^{C2}$=Fe, Mn, Ni, Co, Cr, or Ti; 0≤x≤1), Li$_3$V$_{2-x}$M$_x$(PO$_4$)$_3$ (M=Cr, Co, Fe, Mg, Y, Ti, Nb, or Ce; 0≤x≤1), LiVPO$_4$F, LiM$^{C1}_x$M$^{C21}_{1-x}$O$_2$ ((M$^{C1}$ or M$^{C2}$ Fe, Mn, Ni, Co, Cr, Ti, Mg, Al; 0≤x≤1), LiM$^{C1}_x$M$^{C2}_y$M$^{C3}_{1-x-y}$O$_2$ ((M$^{C1}$, M$^{C2}$, or M$^{C3}$=Fe, Mn, Ni, Co, Cr, Ti, Mg, or Al; 0≤x≤1; 0≤y≤1), LiMn$_{2-y}$X$_y$O$_4$ (X=Cr, Al, or Fe, 0≤y≤1), LiNi$_{0.5-y}$X$_y$Mn$_{1.5}$O$_4$ (X=Fe, Cr, Zn, Al, Mg, Ga, V, or Cu; 0≤y≤0.5), xLi$_2$MnO$_3$·(1-x)LiM$^{C1}_y$M$^{C2}_z$M$^{C3}_{1-y-z}$O$_2$(M$^{C1}$, M$^{C2}$, or M$^{C3}$=Mn, Ni, Co, Cr, Fe, or mixture of; x=0.3-0.5; y≤0.5; z≤0.5), Li$_2$MSiO$_4$ (M=Mn, Fe, or Co), Li$_2$MSO$_4$ (M=Mn, Fe, or Co), LiMSO$_4$F (Fe, Mn, or Co), Li$_{2-x}$(Fe$_{1-y}$Mn$_y$)P$_2$O$_7$ (0≤y≤1). Further materials of the cathodes may include Li-containing compounds which can react with Li through conversion reactions during the charge/discharge process. Examples of the conversion compounds include Li$_2$O$_2$, Li$_2$S, and LiF. The cathode can be either prepared as a free standing film with conductive additives or deposited on a conductive substrate which is stable with the electrolyte within the operation voltage window of the battery.

Experimental Section

The following examples serve to illustrate embodiments and aspects of the present invention and are not to be construed as limiting the scope thereof.

Example 1

Figure 2:
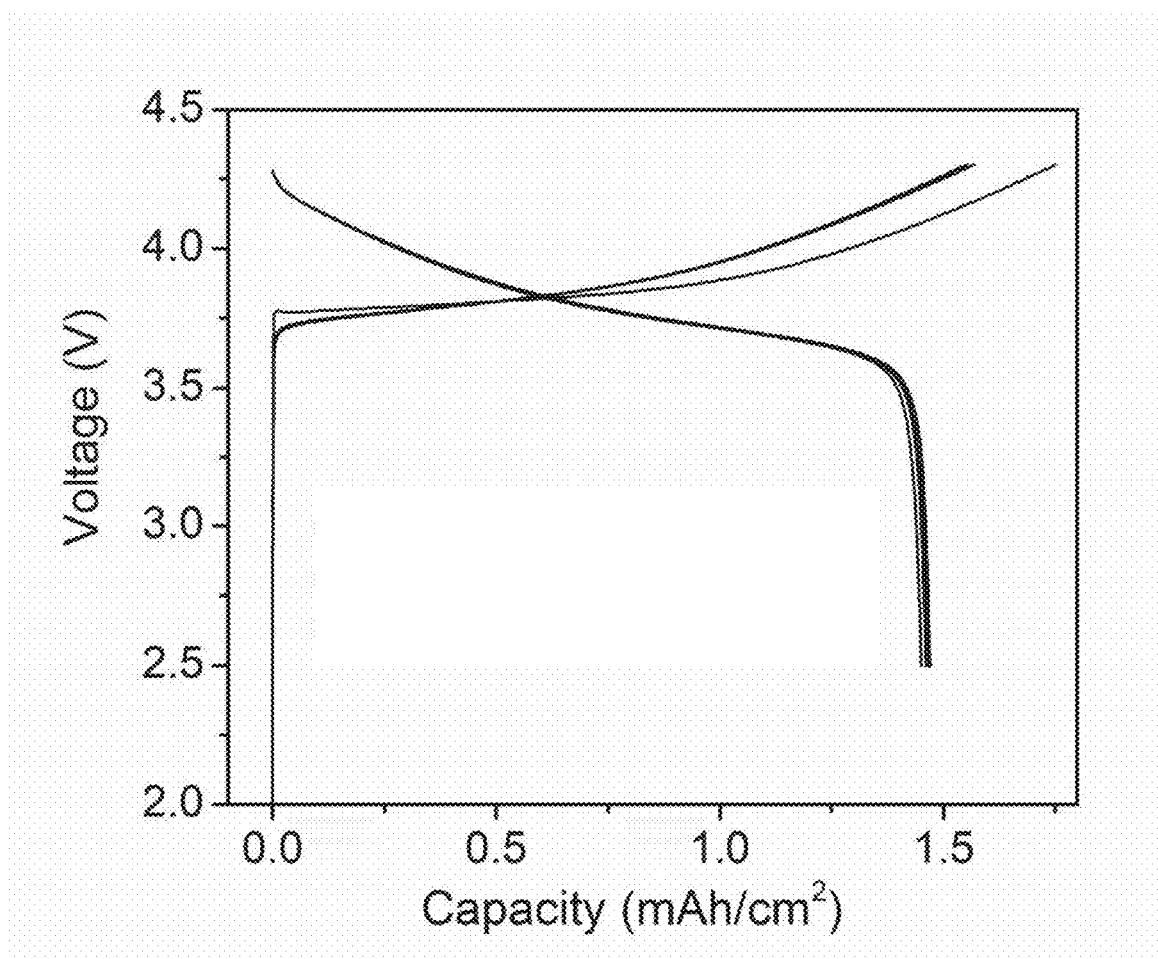
FIG. 2 is a graph of the voltage curves of a Cu|LiNi$_{1/3}$Mn$_{1/3}$Co$_{1/3}$O$_2$(NMC) type anode-free rechargeable battery for the first four charge/discharge cycles using an electrolyte of 4 M LiFSI in DME. The current density is 0.5 mA/cm$^2$.

A coin cell type anode-free Li rechargeable battery was assembled using copper (Cu) foil as the anode current collector, a LiNi$_{1/3}$Co$_{1/3}$Mn$_{1/3}$O$_2$ (NMC) thick film coated on an Al substrate as the cathode, Celgard™ 2045 as the separator, and 4 M LiFSI in DME as the liquid electrolyte. The Cu foil substrate was washed by immersing it in 1 M hydrochloric acid for 10 min, and rinsed by distilled water and acetone three times, respectively, followed by a quick drying in a vacuum chamber. The NMC electrode was provided by Argonne National Laboratory with a nominal capacity of ~1.5 mAh/cm$^2$. The cell was cycled between 2.5 and 4.2 V at a constant current density of 0.5 mA/cm$^2$. FIG. 2 shows the charge-discharge profiles of the Cu|NMC type battery. This cell delivers an initial charge/discharge capacity of 1.75/1.47 mAh/cm$^2$, giving a high initial Coulombic Efficiency of 84%. The reversible capacity is identical to its nominal capacity and keeps stable without distinct capacity degradation during the first four cycles.

Example 2

Figure 3:
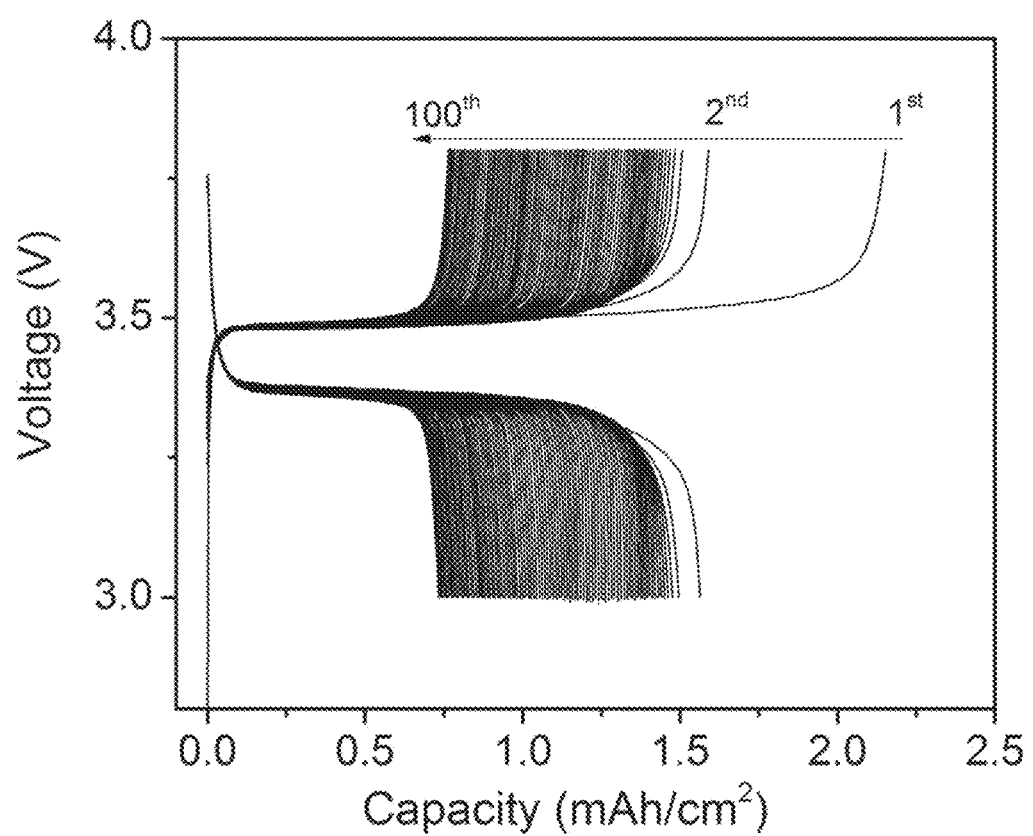
FIG. 3 shows the voltage profiles of a Cu/LiFePO$_4$ anode-free rechargeable battery using an electrolyte of 4M LiFSI in DME. Current density is 0.2 mA/cm$^2$.
Figure 4:
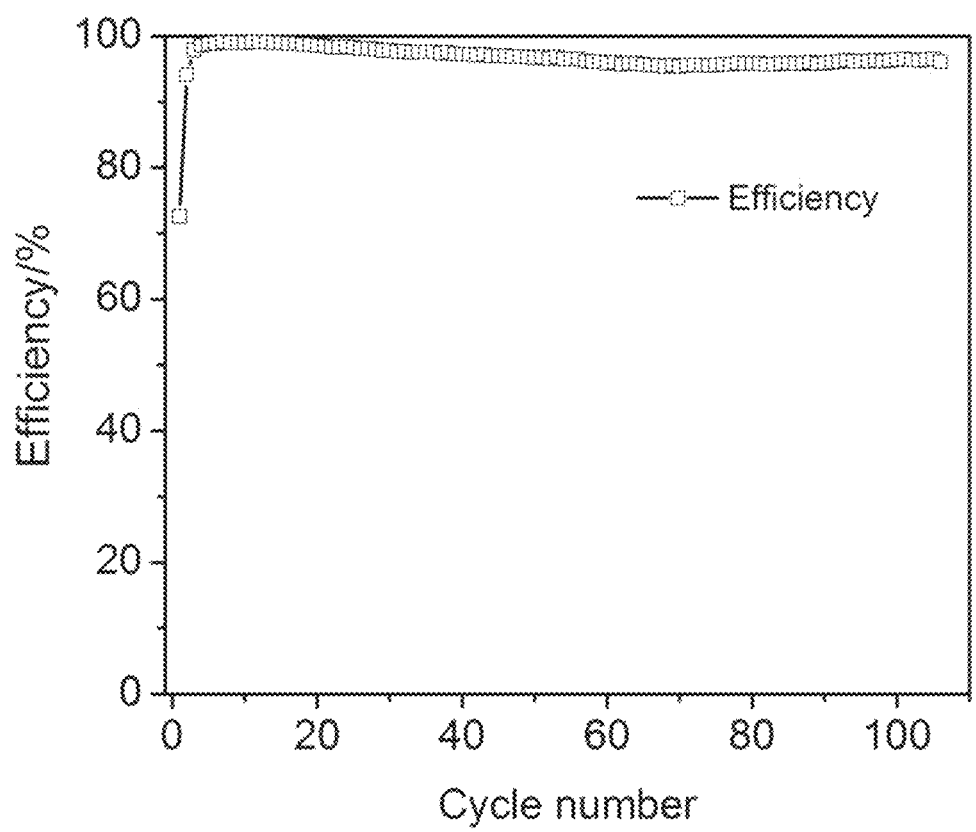
FIG. 4 shows the Coulombic efficiencies as a function of cycle number for a Cu/LiFePO$_4$ anode-free rechargeable battery using an electrolyte of 4 M LiFSI in DME. Current density is 0.2 mA/cm$^2$.

A coin cell type anode-free Li rechargeable battery was assembled using copper foil as the anode current collector, LiFePO$_4$ film as the cathode, Celgard™ 2045 as the separator, and 4 M LiFSI in DME as the liquid electrolyte. A LiFePO$_4$ cathode is a free standing film (no substrate) composed of LiFePO$_4$, conductive carbon (Super P™) and Polytetrafluoroethylene (PTFE) binder in a ratio of 70:20:10. The cell was cycled between 3 and 3.8 V at a current density of 0.2 mA/cm$^2$. FIG. 3 shows the voltage as a function of capacity of the cells during 100 cycles. The cell exhibits an initial discharge capacity of 2.2 mAh/cm$^2$. FIG. 4 shows the Coulombic efficiency of this Cu|LiFePO$_4$ battery as a function of cycle number. The average Coulombic Efficiency of the cell was 99.1% over 100 cycles (excluding the first cycles which exhibit relatively large capacity loss of 9.5%).

Example 3

Figure 5:
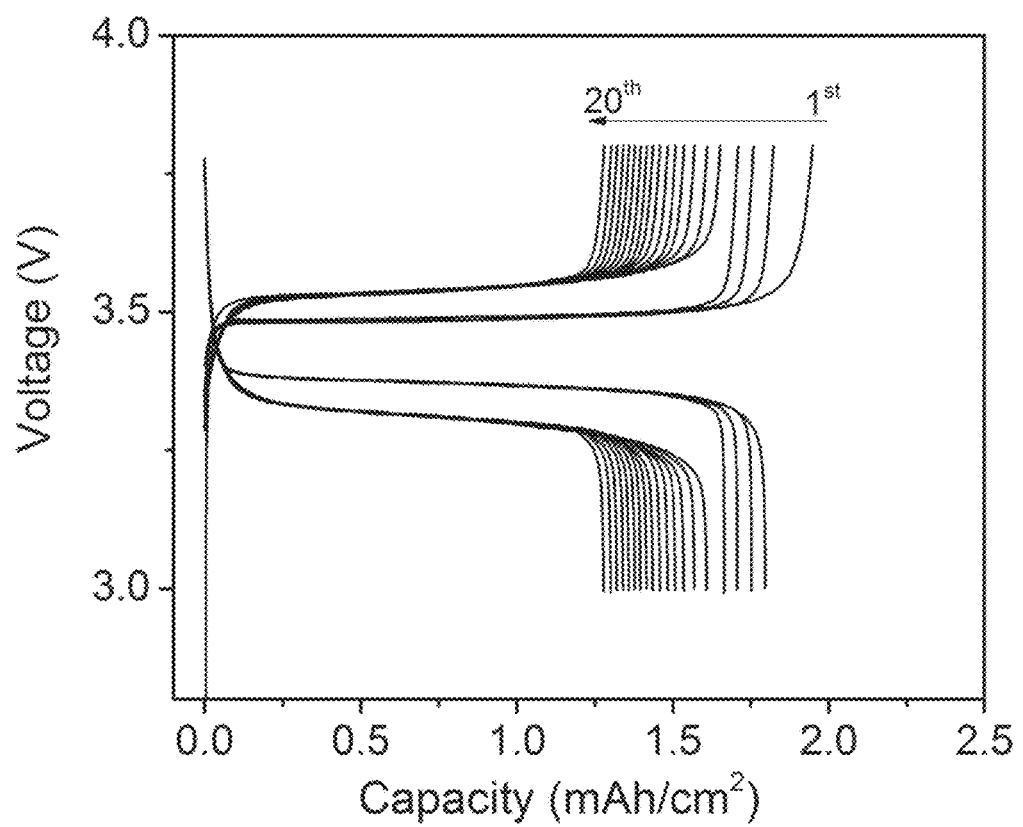
FIG. 5 shows the voltage profiles of Cu/LiFePO$_4$ cell in the first five cycles using an electrolyte of 4 M LiFSI in DME. Current density is 0.2 mA/cm$^2$ for the first four cycles and 0.5 mA/cm$^2$ for the fifth cycle.
Figure 6:
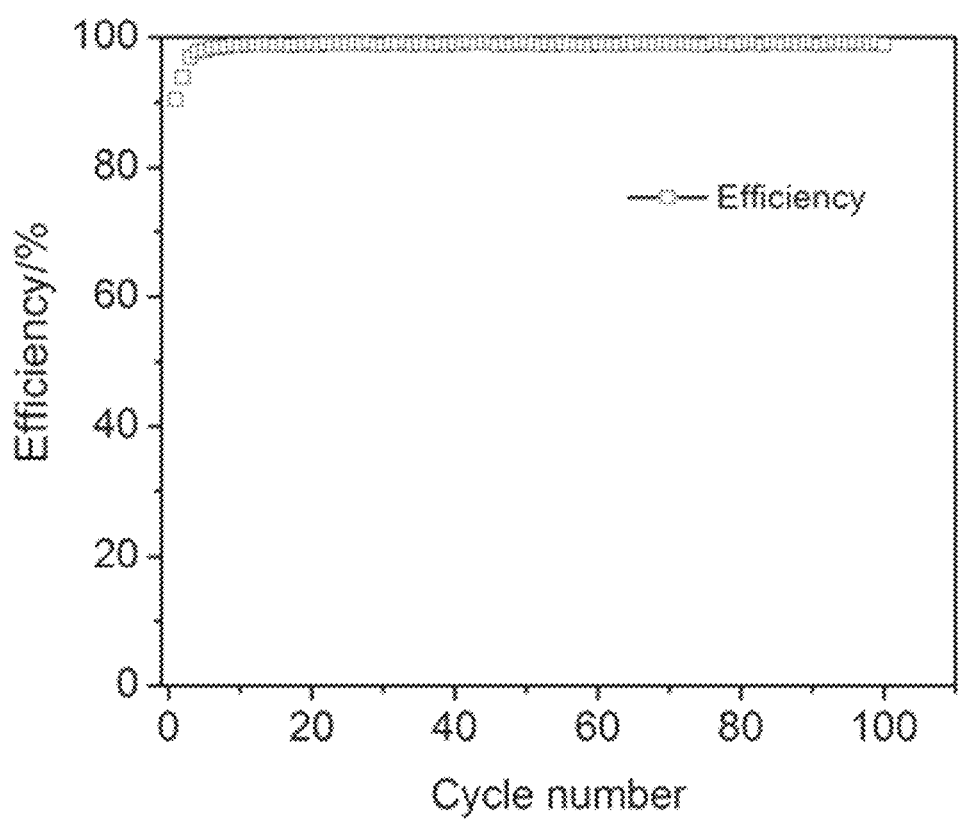
FIG. 6 shows the Coulombic efficiencies as a function of cycle number for a Cu/LiFePO$_4$ cell using an electrolyte of 4 M LiFSI in DME. Current density is 0.2 mA/cm$^2$ for the first four cycles and 0.5 mA/cm$^2$ for the subsequent cycles.

A sample with a structure similar to the one described in Example 2 was cycled at a low current rate of 0.2 mA/cm$^2$ for the first four cycles then cycled at 0.5 mA/cm$^2$ for further cycles. A coin cell type anode-free Li rechargeable battery was assembled using copper foil as the anode current collector, a free standing LiFePO$_4$ film (LiFePO4:Super P™:PTFE=70:20:10) as the cathode, Celgard™ 2045 as the separator, and 4 M LiFSI in DME as the liquid electrolyte. The cell was initially cycled between 3 and 3.8 V at a current density of 0.2 mA/cm$^2$ for the first 4 cycles, then cycled at a current density of 0.5 mA/cm$^2$. FIG. 5 shows the voltage profiles of the battery as a function of capacity in the first five cycles. The cell exhibits an initial discharge capacity of 1.8 mAh/cm$^2$. FIG. 6 shows the Coulombic efficiency of a Cu|LiFePO$_4$ battery as a functional of cycle number. The initial Coulombic efficiency of the cell is more than 92%. The average Coulombic efficiency of the cell is ~98% in 100 cycles.

Example 4

Figure 7:
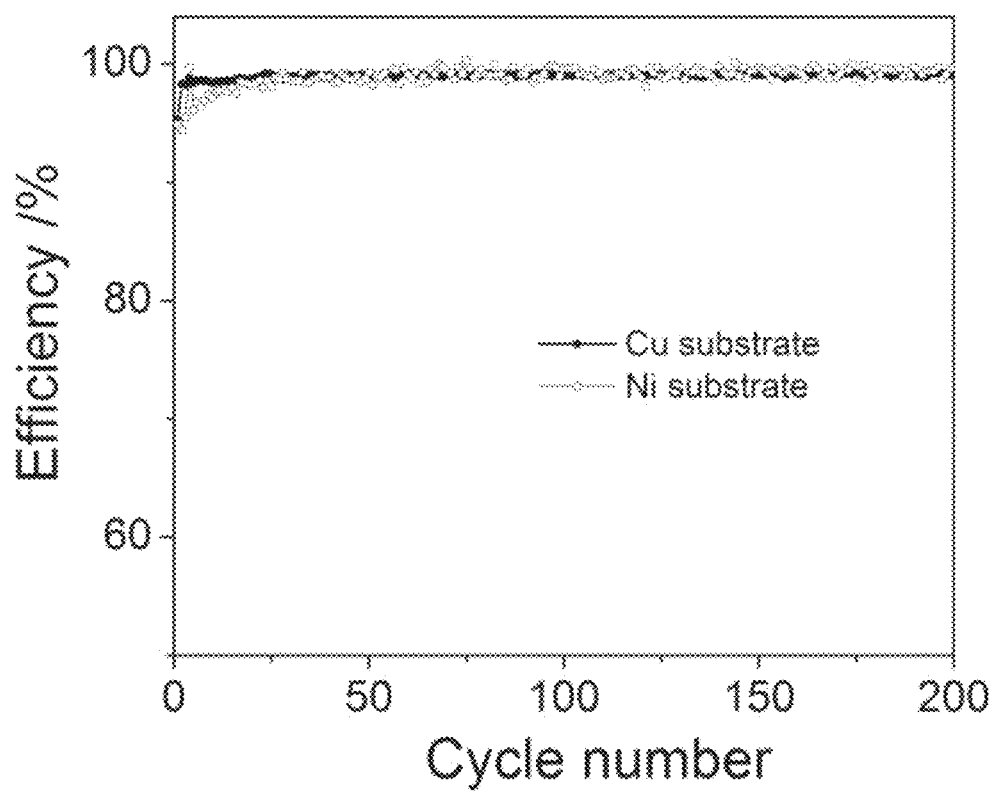
FIG. 7 shows the Coulombic efficiency as a function of cycle number for Li metal deposition/stripping on a Cu (solid point) or Ni (open circle) anode current collector.

Cycling performance of Li metal is examined using 2032-type coin cells. Lithium foil was used as both the counter and reference electrodes. Cu or Ni substrate is used as working electrode. Celgard™ 2045 is used as the separator, and 4 M LiFSI in DME is used as the liquid electrolyte. Li is deposited on the substrate using a current density of 0.5 mA/cm$^2$ for 1 h and stripped until an upper voltage of 0.5 V is reached. FIG. 7 shows the Coulombic efficiency of the cells as a function of cycle number. The average Coulombic Efficiency of the cell using Cu substrate is 99.1% in 200 cycles (excluding the initial cycles which exhibit relatively large capacity loss). The average Coulombic Efficiency of the cell using Ni substrate is 99.2% in 200 cycles (excluding the initial cycles which exhibit relatively large capacity loss).

Example 5

Figure 8A:
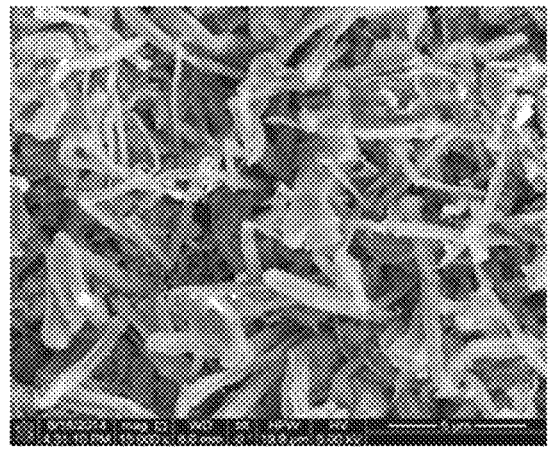
FIG. 8 compares the scanning electron microscopic (SEM) images of surface micrographs of Li films deposited on a Cu substrate using an electrolyte of (A) 1 M LiPF$_6$ in PC and (B) 4 M LiFSI in DME.
Figure 8B:
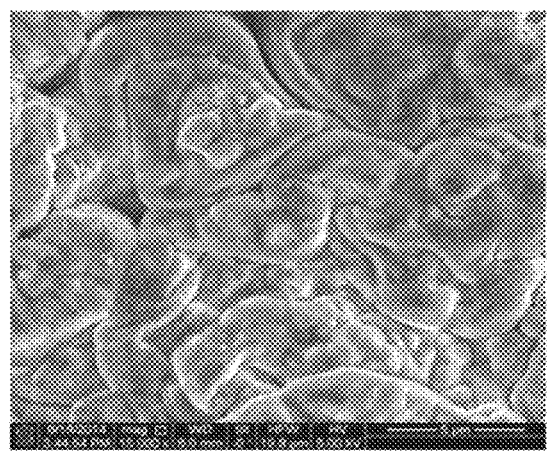

Li was deposited on a Cu substrate at a current density of 0.5 mA/cm$^2$ for 3 h using two different electrolytes. The total Li deposited was 1.5 mAh/cm$^2$ which is similar to the amount of Li utilized in Examples 2 and 3. FIG. 8 compares the SEM surface micrographs of Li films deposited on the Cu substrate. When Li was deposited in 1 M LiPF$_6$ in PC, as shown in FIG. 8A, needle like dendrites were clearly formed. In contrast, the morphology of the Li surface deposited in 4 M LiFSI in DME, as shown in FIG. 8B, looks like a compressed rubber like material which is absent of any sharp edges so the penetration of Li through the polymer separator and the danger of the short circuit can be avoided. Comparing FIGS. 8A and 8B, it is found that the surface area of Li film deposited in 4 M LiFSI in DME is much smaller than those deposited in 1 M LiPF$_6$ in PC. This is consistent with the much higher Coulombic efficiency of Li deposition in 4 M LiFSI in DME (~99%) as compared to those obtained in 1 M LiPF$_6$ in PC (~76%).

Example 6

Figure 9A:
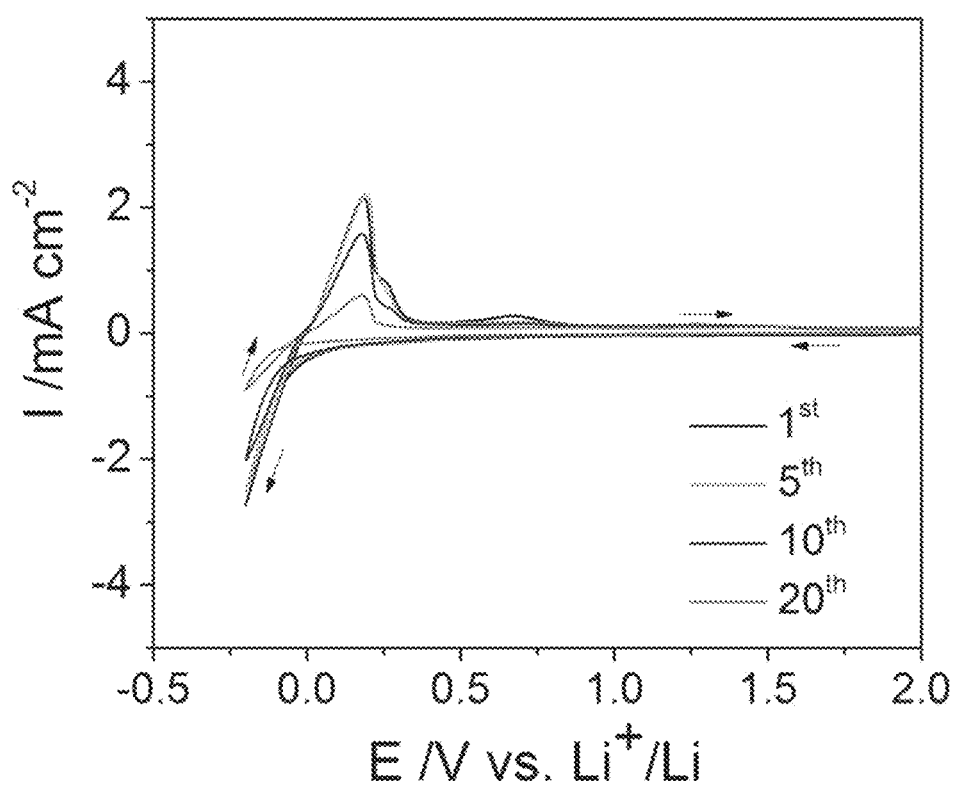
FIG. 9 compares cyclic voltammetry data for Li deposition/stripping processes at different electrolytes: (A) in 1 M LiPF$_6$ in PC; (B) in 4 M LiFSI in DME. Li was deposited and stripped from a Cu substrate at a voltage scan rate of 50 mV/s.
Figure 9B:
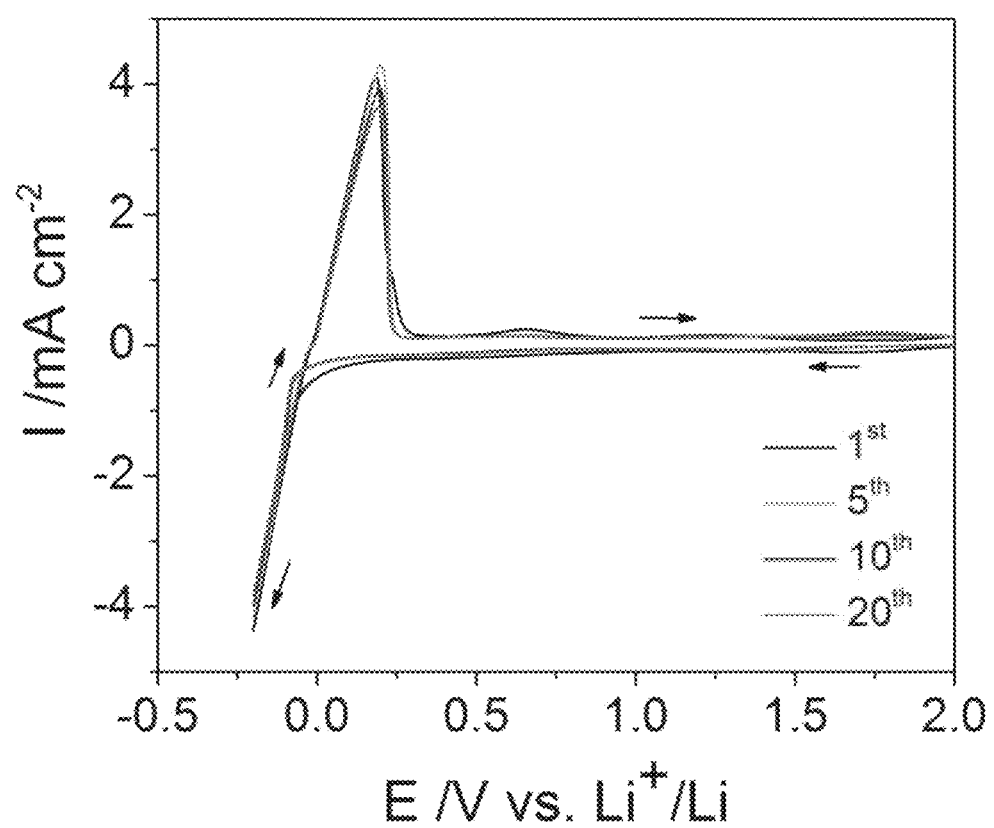

Cyclic voltammetry was used to examine the reversibility of the Li deposition/stripping process for different electrolytes. In this example, Li was deposited and stripped from a Cu substrate at a voltage scan rate of 50 mV/s. FIG. 9A shows the cyclic voltammetry data for Li deposited/stripped in an electrolyte of 1 M LiPF$_6$ in PC. A clear variation in the scan current density is observed from 1$^{st}$ to 20$^{th}$ cycle. This variation corresponds to a Coulombic efficiency of ~76%. In contract, the cyclic voltammetry data shown in FIG. 9B exhibits minimal variations in the scan current density for Li deposited/stripped in an electrolyte of 4 M LiFSI in DME. This variation corresponds to a Coulombic efficiency of ~99%.

Example 7

Figure 10:
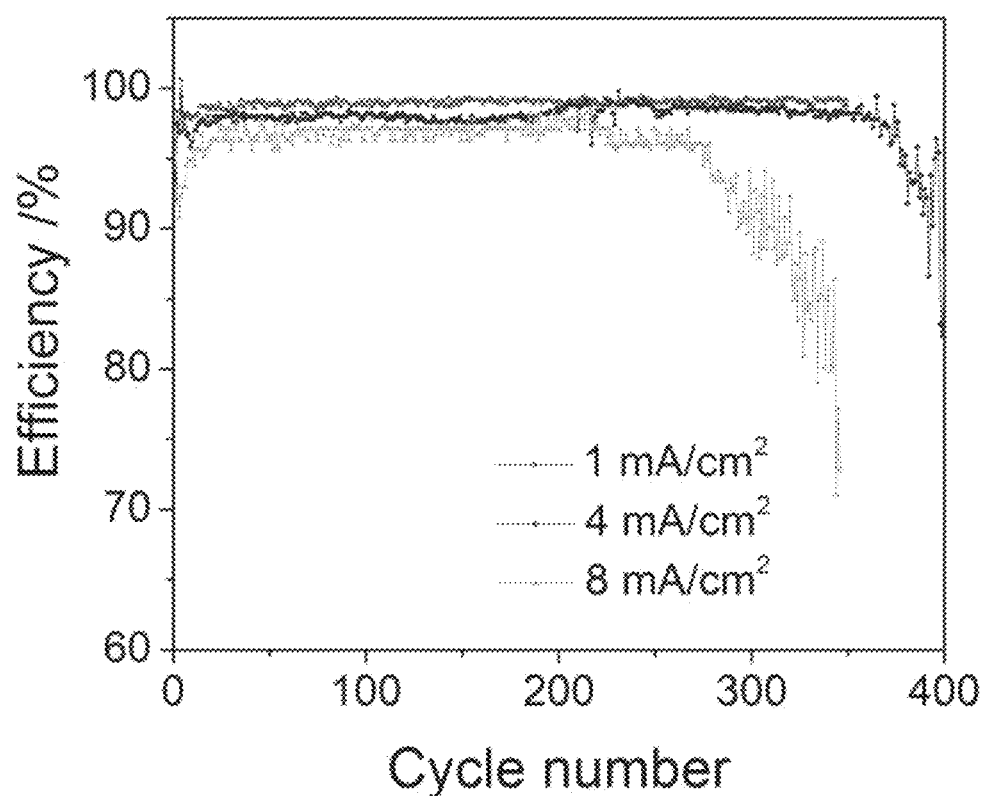
FIG. 10 compares the Coulombic efficiency of Li deposition/stripping processes as a function of cycle number at different current densities. The electrolyte is 4 M LiFSI in DME.
Figure 11:
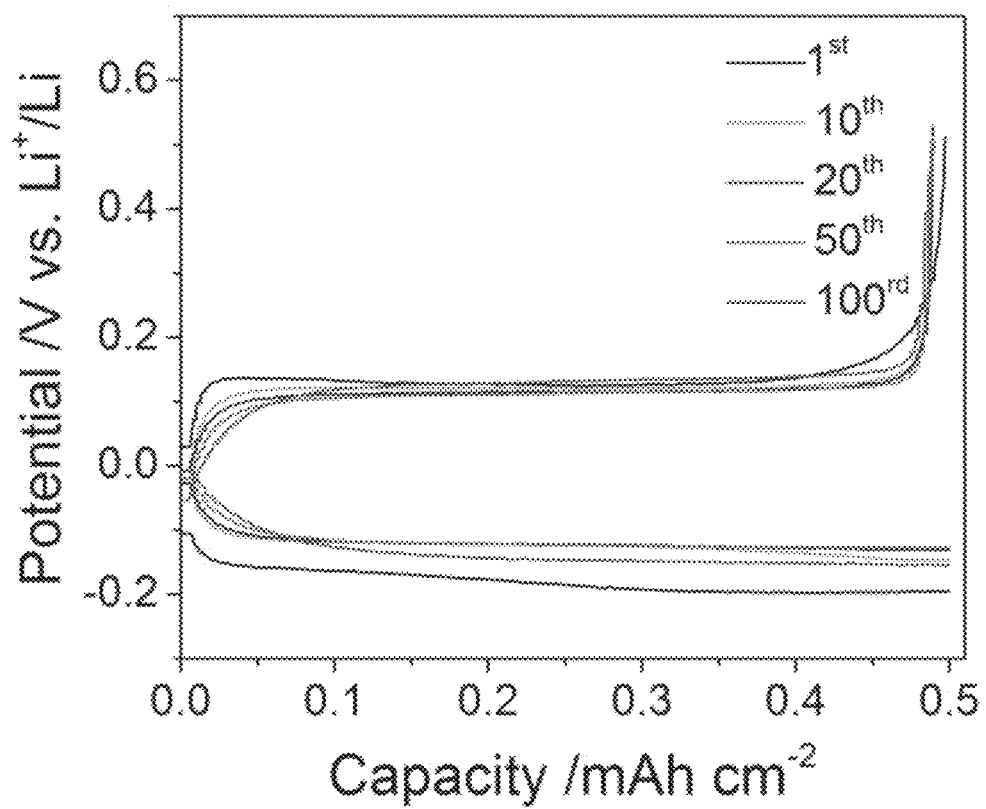
FIG. 11 compares the voltage profile of Li deposition/stripping processes at $1^{st}$, $10^{th}$, $20^{th}$, $50^{th}$, and $100^{th}$ cycles when the current density is 4 mA/cm$^2$. The electrolyte is 4 M LiFSI in DME.

Li was deposited on a Cu substrate at different current densities of 1 mA/cm$^2$, 4 mA/cm$^2$, and 8 mA/cm$^2$ in an electrolyte of 4 M LiFSI in DME. Total Li deposited was 0.5 mAh/cm$^2$. FIG. 10 shows the Coulombic efficiency (CE) of Li deposition/stripping processes as a function of cycle number at different current densities. At a current density of 1 mA/cm$^2$ and 4 mA/cm$^2$, the sample retains a CE of 99.1% and 98.4%, respectively at more than 350 cycles. Even at a current density of 8 mA/cm$^2$, the sample still retains a CE of 97.1% at more than 250 cycles. FIG. 11 shows the voltage profiles of the Li deposition/stripping at 1$^{st}$, 10$^{th}$, 20$^{th}$, 50$^{th}$, and 100$^{th}$ cycles. No significant differences are identified in the voltage profiles within 100 cycles. This is a clear indication of the stability of Li deposition/stripping processes in an electrolyte of 4 M LiFSI in DME.

The anode-free rechargeable battery improves the energy density of Li-based batteries. Since the anode can be eliminated from the battery structure, the battery weight and volume can be reduced and the energy density of the battery can be largely increased. The anode-free battery also allows a minimal loss of the active ions, such as lithium ions, used for battery operation.

A highly stable electrolyte and a stable anode current collector allow for the practical application of the anode-free rechargeable battery. The highly stable electrolytes have only negligible reactions with the lithium metal, and the electrolytes can prevent lithium dendrite growth during the cycling process. The anode current collector have negligible reaction with the lithium at the operating temperature range of batteries The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. An assembled rechargeable cell comprising:
   in a state having charge,
      a. an anode current collector,
      b. a cathode containing lithium cations intercalated within the cathode,
      c. a separator positioned between the anode current collector and the cathode,
      d. a liquid electrolyte including a salt or salt mixture dissolved in a solvent or solvent mixture, wherein the salt or salt mixture comprises lithium bis(fluorosulfonyl)imide (LiFSI), lithium hexafluoroarsenate (LiAsF$_6$), lithium trifluoromethanesulfonate (LiCF$_3$SO$_3$), lithium bis(trifluoromethanesulfonyl)imide (LiTFSI), lithium bis(oxalato)borate (LiBOB), lithium difluoro(oxalato)borate (LiDFOB), lithium perchlorate (LiClO$_4$), lithium tetrafluoroborate (LiBF$_4$), or a mixture thereof, wherein the solvent is an ether or solvent mixture which comprises 1,2-dimethoxyethane (DME), diglyme, triglyme, tetraglyme, diethyl ether, 1,3-dioxolane, 1,4-dioxane, tetrahydrofuran, 2,5-dimethyltetrahydrofuran, ethylene carbonate, propylene carbonate, dimethyl carbonate, ethyl methyl carbonate, diethyl carbonate, vinylene carbonate, fluoroethylene carbonate, vinyl ethyl carbonate, trimethyl phosphate, triethyl phosphate, triphenyl phosphate, tris(2,2,2-trifluoroethyl)phosphate, tris(2,2,2-trifluoroethyl)phosphite, dimethyl sulfone, ethyl methyl sulfone, sulfolane, sulfoxide, acetonitrile, propionitrile, butyronitrile, or a mixture thereof, wherein the concentration of the lithium cation in the electrolyte is between 3-8 M, wherein the separator is infused with the electrolyte including the salt or salt mixture dissolved in the solvent, and wherein the salt or salt mixture and the solvent or solvent mixture are selected to provide the assembled rechargeable cell with an average Coulombic Efficiency of at least 99% after the first ten cycles, and
      e. an in situ-formed anode on a surface of the anode current collector facing the separator; and
   in an uncharged state,
      a. the anode current collector, wherein the assembled rechargeable cell does not comprise an anode in the uncharged state,
      b. the cathode containing lithium cations intercalated within the cathode, c. the separator positioned between the anode current collector and the cathode, and d. the liquid electrolyte including a salt or salt mixture dissolved in a solvent or solvent mixture.

2. The assembled rechargeable cell of claim 1 wherein the separator is a porous polymer material.

3. The assembled rechargeable cell of claim 1 wherein at least one of the following non-lithium salts is added to the electrolyte: CsFSI, CsTFSI, NaFSI-CsFSI, $Mg(TFSI)_2$-CsTFSI, and $Zn(TFSI)_2$.

4. The assembled rechargeable cell of claim 1 wherein the lithium salt of the electrolyte is LiFSI dissolved in DME.

5. The assembled rechargeable cell of claim 1 wherein the anode current collector comprises copper, nickel, iron, stainless steel or other metals that are stable when in contact with Li and the electrolyte within the operating voltage window of the assembled rechargeable cell.

6. The assembled rechargeable cell of claim 5 wherein the anode current collector comprises copper, and the cathode is a free standing film including lithium-containing compounds mixed with a conductive additive and binder.

7. The assembled rechargeable cell of claim 5 further comprising a cathode current collector, and wherein the anode current collector comprises copper, the cathode includes lithium-containing compounds mixed with a conductive additive and binder, and the cathode current collector comprises aluminum, nickel or stainless steel.

8. An assembled-rechargeable cell comprising:
in a state having charge,
  a. a copper anode current collector,
  b. a cathode including lithium containing compounds intercalated within the cathode,
  c. a separator positioned between the anode current collector and the cathode,
  d. a liquid electrolyte including LiFSI dissolved in DME, and
  e. an in situ-formed anode on a surface of the anode current collector facing the separator; and
in an uncharged state,
  a. the copper anode current collector, wherein the assembled rechargeable cell does not comprise an anode in the uncharged state,
  b. the cathode including lithium containing compounds intercalated within the cathode,
  c. the separator positioned between the anode current collector and the cathode, and
  d. the liquid electrolyte including LiFSI dissolved in DME,
wherein the separator is infused with the liquid electrolyte, a concentration of the LiFSI in the DME is between 3-8 M, the assembled rechargeable cell does not comprise an anode in an uncharged state, and the assembled rechargeable cell has a Coulombic Efficiency of at least 99% after the first ten cycles.

9. The assembled rechargeable cell of claim 8 further comprising a cathode current collector, wherein the cathode current collector is aluminum, nickel, titanium, stainless steel, or carbon paper.

10. An assembled rechargeable cell comprising:
in an initial assembled and uncharged state,
  a. an anode current collector, wherein the assembled rechargeable cell does not comprise an anode in the initial assembled and uncharged state,
  b. a cathode containing lithium cations intercalated within the cathode,
  c. a separator positioned between the anode current collector and the cathode, and
  d. a liquid electrolyte including a salt or salt mixture dissolved in a solvent or solvent mixture, wherein the salt or salt mixture comprises lithium bis(fluorosulfonyl)imide (LiFSI), lithium hexafluoroarsenate ($LiAsF_6$), lithium trifluoromethanesulfonate ($LiCF_3SO_3$), lithium bis(trifluoromethanesulfonyl)imide (LiTFSI), lithium bis(oxalato)borate (LiBOB), lithium difluoro(oxalato)borate (LiDFOB), lithium perchlorate ($LiClO_4$), lithium tetrafluoroborate ($LiBF_4$), or a mixture thereof, wherein the solvent is an ether or solvent mixture which comprises 1,2-dimethoxyethane (DME), diglyme, triglyme, tetraglyme, diethyl ether, 1,3-dioxolane, 1,4-dioxane, tetrahydrofuran, 2,5-dimethyltetrahydrofuran, ethylene carbonate, propylene carbonate, dimethyl carbonate, ethyl methyl carbonate, diethyl carbonate, vinylene carbonate, fluoroethylene carbonate, vinyl ethylene carbonate, trimethyl phosphate, triethyl phosphate, triphenyl phosphate, tris(2,2,2-trifluoroethyl)phosphate, tris(2,2,2-trifluoroethyl)phosphite, dimethyl sulfone, ethyl methyl sulfone, sulfolane, sulfoxide, acetonitrile, propionitrile, butyronitrile, or a mixture thereof, wherein the concentration of the lithium cation in the electrolyte is between 3-8 M, wherein the separator is infused with the electrolyte including the salt or salt mixture dissolved in the solvent, and wherein the salt or salt mixture and the solvent or solvent mixture are selected to provide the assembled rechargeable cell with an average Coulombic Efficiency of at least 99% after the first ten cycles;
in a charged state,
  a. the anode current collector,
  b. the cathode containing lithium cations intercalated within the cathode,
  c. the separator positioned between the anode current collector and the cathode, and
  d. the liquid electrolyte including a salt or salt mixture dissolved in a solvent or solvent mixture, and
  e. an in situ-formed anode on a surface of the anode current collector facing the separator; and
in a subsequent uncharged state,
  a. the anode current collector, wherein the assembled rechargeable cell does not comprise an anode in the uncharged state,
  b. the cathode containing lithium cations intercalated within the cathode,
  c. the separator positioned between the anode current collector and the cathode, and
  d. the liquid electrolyte including a salt or salt mixture dissolved in a solvent or solvent mixture.

* * * * *